United States Patent [19]

Kritz

[11] 4,063,214
[45] Dec. 13, 1977

[54] LENS TRANSDUCER FOR USE IN MARINE SONAR DOPPLER APPARATUS

[75] Inventor: Jacob A. Kritz, Westbury, N.Y.

[73] Assignee: Sperry Rand Corporation, New York, N.Y.

[21] Appl. No.: 640,604

[22] Filed: Dec. 15, 1975

[51] Int. Cl.² .......................................... H04B 13/00
[52] U.S. Cl. ..................................... 340/8 L; 340/3 D; 340/10
[58] Field of Search ......... 340/3 D, 8 R, 8 L, 8 MM, 340/9, 10, 12 R; 310/8.7; 73/67.5 R, 67.6 R, 67.7 R, 71.5 US

[56] References Cited

U.S. PATENT DOCUMENTS

| | | | |
|---|---|---|---|
| 2,448,365 | 8/1948 | Gillespie | 340/8 L |
| 2,984,756 | 5/1961 | Bradfield | 310/8.7 X |
| 3,074,268 | 1/1963 | Rafferty et al. | 73/67.5 R |
| 3,728,670 | 4/1973 | Rosauer et al. | 340/3 D |
| 3,795,893 | 7/1971 | Kritz et al. | 340/3 D |
| 3,818,425 | 6/1974 | Peynaud et al. | 340/3 D |
| 3,893,076 | 7/1975 | Clifford | 340/3 D |
| 3,913,386 | 10/1975 | Saglio | 73/67.5 R |

FOREIGN PATENT DOCUMENTS 39,457   7/1965   Germany ............................... 73/67.7

Primary Examiner—Harold Tudor
Attorney, Agent, or Firm—Howard P. Terry; Joseph M. Roehl

[57] ABSTRACT

An acoustic lens for marine doppler sonar apparatus of the type in which acoustic energy is radiated and received along a beam directed at an angle with respect to a ship's axis is fabricated so as to have an external surface substantially flush with the ship's hull and an internal surface angularly disposed with respect to the external surface. Electro-acoustic transformation elements are mounted on the internal surface. The lens material is selected to have an acoustic propagation velocity greater than that of water so that acoustic signals are refracted in passing across the lens-water interface. The lens prevents spurious acoustic signals that would ordinarily be reflected from the aerated water close to the ship's hull from reaching the electro-acoustic transformation elements.

1 Claim, 4 Drawing Figures

LENS TRANSDUCER FOR USE IN MARINE SONAR DOPPLER APPARATUS

BACKGROUND OF THE INVENTION

1. Field of the Invention

The present invention relates to marine sonar doppler navigation and guidance apparatus and more particularly to acoustic radiators and receivers for such apparatus.

2. Description of the Prior Art

Doppler sonar equipments used for speed and distance measurement aboard ships are well known in the art. Electro-acoustic transducers are used to generate and receive sound waves in the water. The acoustic energy is beamed into the water at some angle other than 90° with respect to the direction of the vessel's forward velocity so that a component of the velocity coincides with the beam direction. An example of such beam orientation, employed in a "Janus system", wherein two acoustic beams are used for added accuracy, is illustrated in U.S. Pat. No. 3,795,893 entitled "Doppler Speed Log", issued to Jacob A. Kritz and Seymour D. Lerner, and assigned to the present assignee.

Under many conditions of ship operation, air bubbles are entrained under the hull and swept aft. The bubbles adjacent the hull are in a boundary layer of the stream moving past the ship. The velocity of this boundary layer is appreciably less than the free stream velocity remote from the ship's hull, which is the velocity to be measured. The air bubbles represent excellent reflectors of sound energy. In prior art transducers, energy is radiated and received not only along the desired principal lobe, but also along various minor side lobes disposed close to the ship's hull. Energy in these side lobes is often reflected from the air bubbles which are close to the hull surface and present a spurious reflected signal which is comparable to that received from the intended region in the principal lobe. These spurious signals not only cause inaccurate operation, but also result in a high degree of instability in the instrument reading because of the continually varying bubble density.

SUMMARY OF THE INVENTION

According to the principles of the present invention, acoustic energy associated with an electro-acoustic transformation element is passed through a refracting lens constructed so that reflected acoustic energy arising in an area close to the ship's hull is prevented from reaching the electro-acoustic transformation element.

DESCRIPTION OF THE PREFERRED EMBODIMENT

Figure 1:
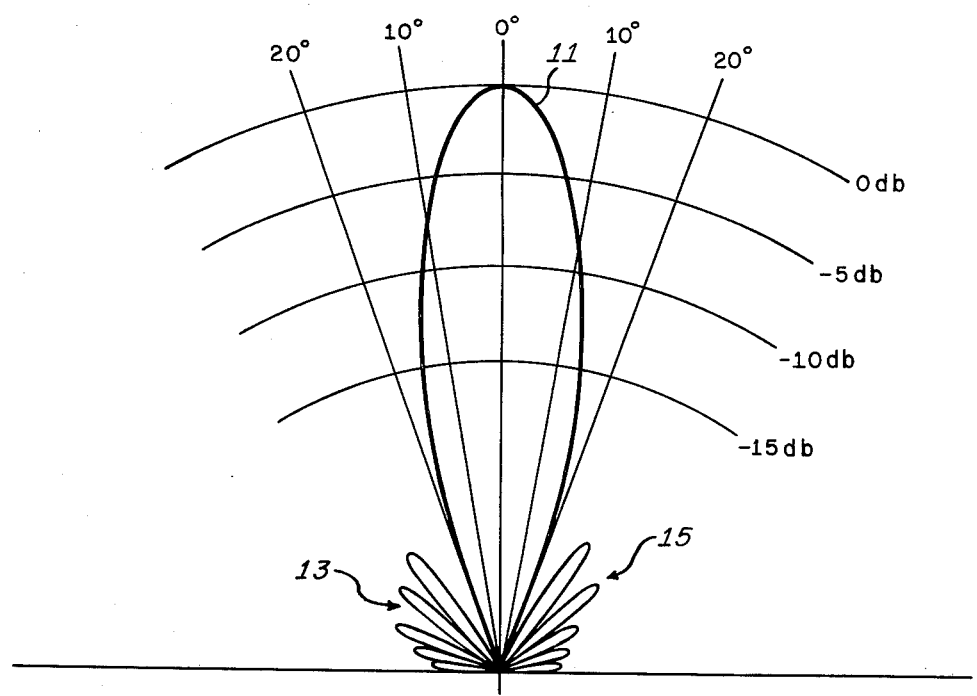
FIG. 1 is a representation of a typical radiation pattern associated with an electro-acoustic transducer.

Doppler sonar equipment of the type under consideration employs electro-acoustic energy transformation elements typically in the form of piezoelectric pistons which deform in response to an applied electric signal so as to produce an acoustic signal corresponding to the applied electric signal. Conversely, such elements produce an electric signal when deformed by an impinging acoustic signal. A typical beam pattern associated with such elements is depicted in FIG. 1, which illustrates the distribution of acoustic energy radiated from the surface of an electro-acoustic transducer when excited by an electric signal. Most of the energy radiates within a narrow angle centered around an axis normal to the face of the energy transformation element as indicated by the principal or primary lobe 11. However, significant amounts of radiation are produced along divergent secondary or side lobes 13 and 15. In sonar dobbler equipment, the desired acoustic energy is radiated and received within the primary lobe, whereas energy radiated and received along the side lobes represents a spurious signal which contributes to inaccurate and unstable readings. The purpose of the present invention is to effectively eliminate these side lobes.

Figure 2:
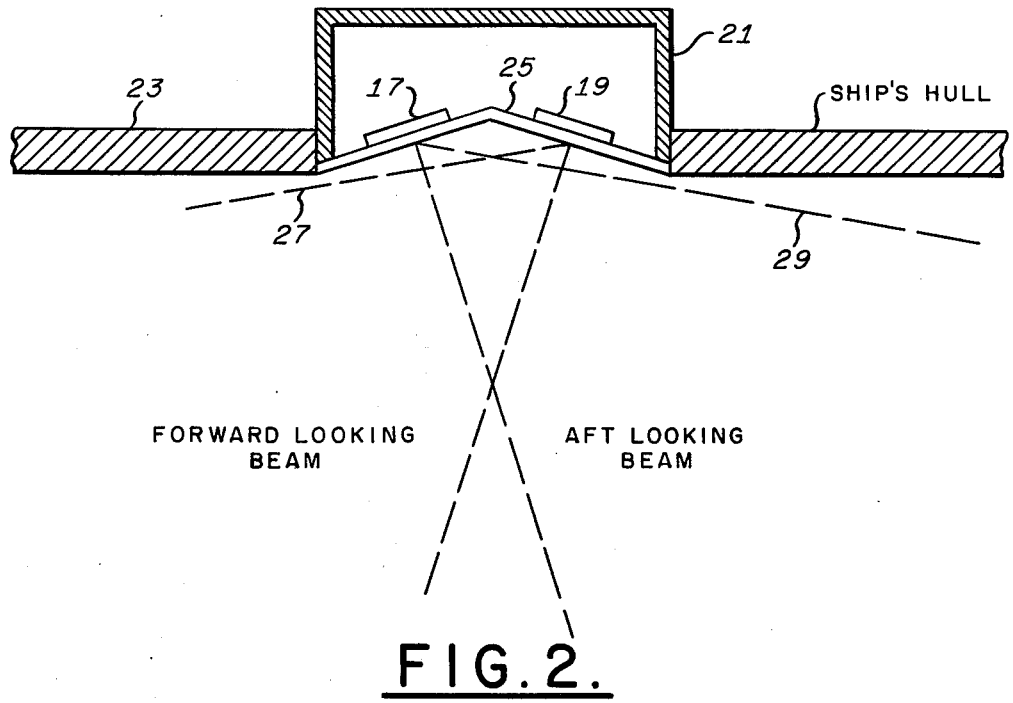
FIG. 2 is a diagram illustrating a typical prior art transducer configuration.

The nature of the problem can be understood by referring to FIG. 2 which illustrates the conventional manner of mounting electro-acoustic energy transformation elements for a Janus system. Piezoelectric energy transformation elements 17 and 19 are mounted within a water-tight transducer housing 21 which is inserted in an aperture in the ship's hull 23. In accordance with the well known Janus principles of operation, the elements 19 and 17 produce forward-looking and aft-looking beams, respectively. Since these beams must have a component parallel to the ship's velocity in order to experience a doppler shift, the elements 17 and 19 must be disposed at an angle with respect to the bottom of the ship's hull. In order to a accomplish this, the elements 17 and 19 are typically mounted on a conical surface 25 forming the bottom of the transducer housing 21. The forward- and aft-looking beams represent the primary lobes associated with the electro-acoustic energy transformation elements and are therefore centered around an axis normal to the faces of the respective elements.

In addition to the energy in the desired beams, energy will also be radiated and received along the axes of the various side lobes such as those represented by the beams 27 and 29 which pass close to the outer surface of the ship's hull where a high degree of aeration may exist. Although the elements 17 and 19 are considerably less sensitive to energy in the side lobes than they are to energy in the primary lobe, the high level of reflectivity of the bubbles in the boundary layer and the proximity of these bubbles to the elements 17 and 19 may produce spurious signals comparable to those received from the intended region in the main beam. These spurious signals produce inaccurate operation and instability in the instrument reading due to the varying bubble density and velocity.

Figure 3:
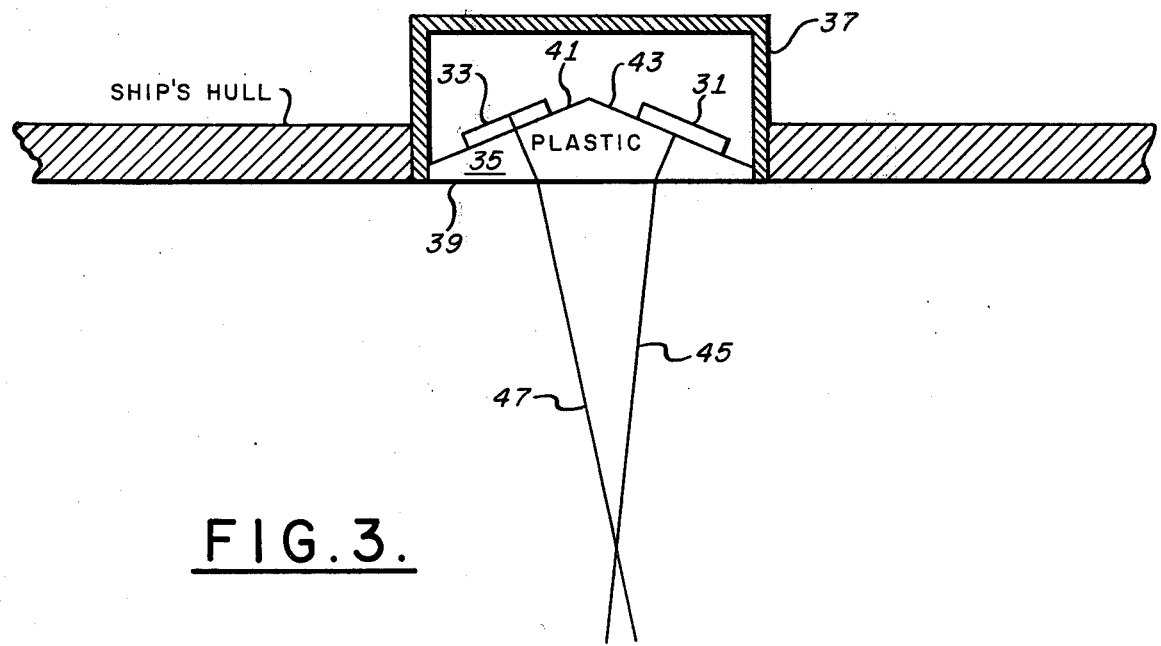
FIG. 3 is a diagram illustrating a transducer configuration constructed in accordance with the principles of the present invention.

A lens transducer constructed in accordance with the principles of the invention is illustrated in FIG. 3. Electro-acoustic energy transformation elements 31 and 33 are mounted on a lens element 35 within the transducer housing 37. The lens element, which will be described in detail, contains an outer surface 39 which is substantially flush with the outer surface of the ship's hull and inner surfaces 41 and 43 which are disposed at an angle with respect to the outer surface 39. For a Janus system the lens element ordinarily takes the form of a pyramid with two opposing sides containing machined flats to accommodate the disc electro-acoustic transformation elements. Forward-looking and aft-looking beams 45 and 47 are produced by the elements 31 and 33 respectively.

Figure 4:
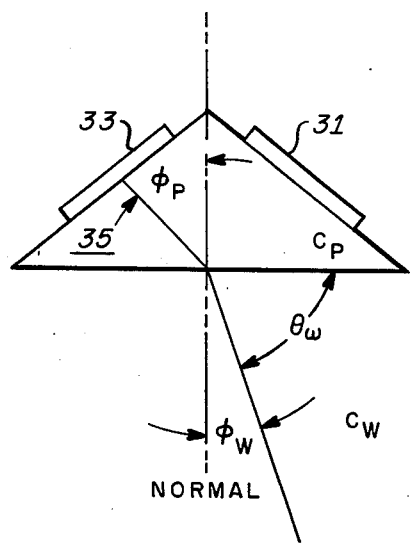
FIG. 4 is a diagram useful in explaining the invention.

The construction and principles of operation of the apparatus of FIG. 3 can be understood by referring to the diagram of FIG. 4, which again depicts the energy transformation elements 31 and 33 mounted on the lens element 35.

The lens element is constructed of a material in which the velocity of sound $C_p$ is somewhat larger than the velocity of sound in water $C_w$. Suitable lenses have been constructed from polystyrene, for example, wherein the velocity of sound is 2317 meters per second as opposed to sea water which typically has a velocity of sound of 1507 meters per second, thus providing a ratio $C_p/C_w$ of approximately 1.5.

In the diagram, $\phi_p$ is the angle of incidence with respect to the lens normal, and $\phi_w$ is the refracted angle in the water medium.

By Snell's Law, the following relationship holds:

$$\frac{\sin \phi_w}{\sin \phi_p} = \frac{C_w}{C_p} \tag{1}$$

Since the lens material was selected to have a greater velocity of sound propagation than that of the water, the ratio of $C_w$ to $C_p$ of equation (1) is less than unity. This causes refraction such that the angle $\phi_w$ is smaller than $\phi_p$ and the beam in the water is refracted toward the normal axis of the lens. Since $\sin \phi_p$ cannot exceed unity, and the ratio of $C_w$ to $C_p$ is less than unity, $\sin \phi_w$ must always be less than 1 or $\phi_w$ must be less than 90°. Thus, the refracted ray cannot approach the hull surface.

In this context, it is useful to define a critical angle which can be calculated from equation (1), by making $\phi_p = 90°$, and remembering that the ratio of $C_w$ to $C_p$ is less than unity. This critical angle is given by:

$$\phi_w \text{ critical} = \arcsin \frac{C_w}{C_p} \tag{2}$$

The implication of this critical angle is that incoming rays exceeding this value (such as those arriving from the vicinity of the hull surface), can never reach the transducer element. Conversely, no rays emitted from the transducing element can possibly illuminate the region beyond the critical angle.

As an example of this application, a lens made from polystyrene, having the characteristics mentioned previously, will provide a critical angle of 40.57°. All transmission and reception using this lens material is therefore confined to a conical region below the lens measuring less than 40.57° from the vertical. In other words, the entire region from the horizontal (hull location) downward 49.43°, cannot contribute acoustic energy in a doppler measurement.

The lens transducer of the present invention further contributes to the accuracy of the sonar doppler measurements in that it provides speed readings independent of water salinity. In prior art devices, for instance, corrections for change in water salinity when traveling from salt to fresh water via estuaries must be made in order to obtain accurate readings. This advantage of the invention can be appreciated by referring to the well known equation relating doppler shift to the velocity of a ship:

$$\Delta f = \frac{2v}{C_w} \cos \theta_w \cdot f_o \tag{3}$$

where
- $\Delta f$ is the doppler difference frequency of an individual beam;
- $v$ is the ship's velocity;
- $C_w$ is the propagation velocity of the water in the vicinity of the transducer;
- $\theta_w$ is the angle between the ship's velocity vector and the transducer beam;
- $f_o$ is the transmitted frequency.

With the use of the lens element, $\theta_w$ is no longer fixed by geometry only, but is now a function of the refractive effects produced by changes in sound velocity. Recognizing the identity $\cos \theta_w = \sin \phi_w$, and substituting from equation (1), equation (3) may be rewritten as:

$$\Delta f = \frac{2v}{C_p} \sin \phi_p \cdot f_o \tag{4}$$

Thus the calibration constant is now dependent upon the velocity of propagation of the lens material, but independent of the velocity of propagation of the water.

Since the lens provides a smooth hull-to-water interface and eliminates the cavity of prior art devices, higher speed operation may be achieved without creating turbulence and cavitation at the transducer.

Furthermore, the use of the acoustic lens reduces the amplitude of flow noise, which is generated by the impact of the water stream on the transducer faces in prior art devices. This effect manifests itself as electrical noise at the piezoelectric crystal outputs and thus competes with the reception of the desired signal. Since the amplitude of received signals follows the well-known square law behavior, moving the flow impact away from the piezoelectric elements to the lens surface greatly reduces the amplitude of the flow generated noise.

Although polystyrene has been mentioned as a lens material, it is to be understood that a wide variety of materials may be used for this element. The choice of lens material is controlled by a number of considerations subject to the designers discretion. While a propagation velocity higher than water is needed, the specific acoustic impedance, that is the product of density and velocity, should preferably be kept close to that of water to permit optimum energy transfer with minimum reflections at the lens-water interface. For this reason, many low density plastics and rubbers are candidate materials. Low acoustic absorption is also desired to minimize the energy loss in the lens. Solid plastics such as polystyrenes and the acrylics, for instance, show many of these desirable properties.

The invention has been described for use in a Janus system. It should be realized, however, that the principles of the invention may be applied to other systems such as those employing only a single acoustic beam.

While the invention has been described in its preferred embodiment, it should be understood that the words which have been used are words of description rather than limitation and that changes within the purview of the appended claims may be made without departing from the true scope and spirit of the invention in its broader aspects.

I claim:

1. A lens transducer for use in a marine vessel's sonar doppler system of the Janus type, said transducer comprising electro-acoustic energy transformation means for radiating and receiving acoustic energy and acoustic lens means, said energy transformation means being of a type having a beam pattern comprising a primary lobe along a preferred axis and secondary lobes along divergent axes, said lens means being in the form of a pyramid and having an external face adapted to be mounted in an aperture in a vessel's hull and internal faces disposed angularly with respect to said external face, said transformation means including first and second transformation elements for producing forward-looking and aft-looking acoustic beams, respectively, and being mounted on opposing internal faces so that the preferred axis of each element is essentially normal to the internal face on which the element is mounted, said lens means being constructed of a material in which the velocity of sound is at least 1.5 times the velocity of sound in water, internal faces of the acoustic lens means are disposed at an angle with respect to said external face such that the energy transformation elements are effectively shielded from reflected acoustic signals arriving within an angle of at least 49° with respect to the vessel's hull.

* * * * *